United States Patent [19]

Cree et al.

[11] Patent Number: 4,994,985
[45] Date of Patent: Feb. 19, 1991

[54] METHODS OF APPENDING A REPLY IN AN ELECTRONIC MAIL SYSTEM

[75] Inventors: Charles M. N. Cree; Margaret G. MacPhail, both of Austin, Tex.

[73] Assignee: International Business Machines Corporation, Armonk, N.Y.

[21] Appl. No.: 384,930

[22] Filed: Jul. 21, 1989

Related U.S. Application Data

[63] Continuation of Ser. No. 138,229, Dec. 23, 1987, abandoned.

[51] Int. Cl.[5] .......................................... G06K 15/00
[52] U.S. Cl. ................................. 364/514; 364/200; 364/284.3; 364/900; 364/943; 364/919; 364/940; 364/940.9; 364/940.6
[58] Field of Search ............... 364/514, 200, 300, 900; 380/25; 340/345; 379/88, 89

[56] References Cited

U.S. PATENT DOCUMENTS

| | | | |
|---|---|---|---|
| 4,264,782 | 4/1981 | Konheim | 364/200 |
| 4,393,269 | 7/1983 | Konheim et al. | 380/25 |
| 4,694,396 | 9/1987 | Weissharr et al. | 364/300 |
| 4,727,495 | 2/1988 | Cheetham et al. | 364/514 |
| 4,745,559 | 5/1988 | Willis et al. | 364/514 |
| 4,754,428 | 6/1988 | Schultz et al. | 364/900 |
| 4,870,571 | 9/1989 | Frink | 364/514 |

OTHER PUBLICATIONS

"For Comment: For Reviewing the Written Word", by Broderbund Software, Inc., 1986.
Bulkeley, "New Software Helps PC Users Work as Groups", *Wall Street Journal*, Jan. or Feb. 24, 1988.

*Primary Examiner*—Parshotam S. Lall
*Assistant Examiner*—Brian M. Mattson
*Attorney, Agent, or Firm*—St. Julian H.; Casimer K. Salys

[57] ABSTRACT

A first end user creates an original note and enters any additional attributes to enable an electronic mail system to deliver the note to an intended second end user. The first end user enters data which informs the second end user of the first end user's intent relating whether the original note should be appended to the reply note. Thereafter, the system delivers the note to the intended recipient end user and appends the original to any reply generated by the recipient end user based upon the intent entered into the system.

4 Claims, 4 Drawing Sheets

METHODS OF APPENDING A REPLY IN AN ELECTRONIC MAIL SYSTEM

This is a continuation of application Ser. No. 07/138,229 filed Dec. 23, 1987, now abandoned.

DESCRIPTION

1. Technical Field

This invention relates to an electronic mail system and more particularly to appending an original note to any reply transmitted in the system.

2. Background Information

Present electronic mail systems allow an end user to communicate within the system by sending notes, messages and documents to one or more recipient end users. Generally, upon receipt of one of the above-identified forms of communication, an end user has the option of reading the communication, filing the communication, forwarding the communication to other end users within the system, erasing the communication, responding to the communication or a combination of the foregoing options. In one known electronic mail system, if an end user decides to forward a received note to another end user and to include a note explaining why the note was forwarded, the system attaches the received note to the note explaining the transmittal. Moreover, if the end user decides to send a reply note in response to a received note, the system automatically attaches the received note to the reply note. If the end user receiving the reply note decides to forward the reply to another end user, the last end user receives a communication which is sometimes very confusing and very long.

As noted above, the recipient end user may decide to send a second note in response to the received note. In this case, the received note is not attached to the reply note. Thus, the recipient of the second note will have to mentally maintain the relationship between the note originally transmitted and the second note received.

Consequently, there is a need for an electronic mail system which will allow for user specified appending of an original note to any reply note generated in response thereto based upon the intent of the original sender.

DISCLOSURE OF THE INVENTION

This invention relates to methods of optionally appending an original note sent by a first end user to a reply note sent by a second end user in response to the original note in an electronic mail system. The first end user creates the original note and enters any additional attributes to enable the system to deliver the note to the intended second end user. Additionally, the first end user enters data which informs the second end user of the first end user's intent relating whether the original note should be appended to the reply note. Thereafter, the system delivers the note to the intended recipient end user and appends the original note to any reply note generated by the recipient end user based upon the intent entered into the system by the first end user.

BEST MODE FOR CARRYING OUT THE INVENTION

Figure 1:
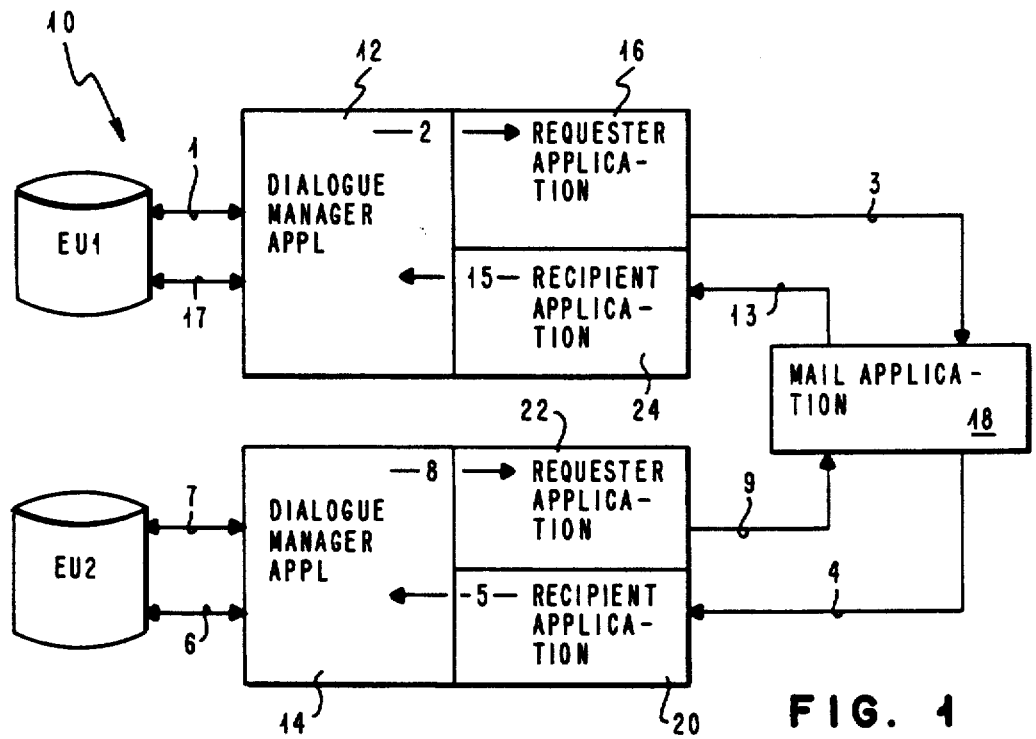
FIG. 1 shows a block diagram of a communication management system.
Figure 2:
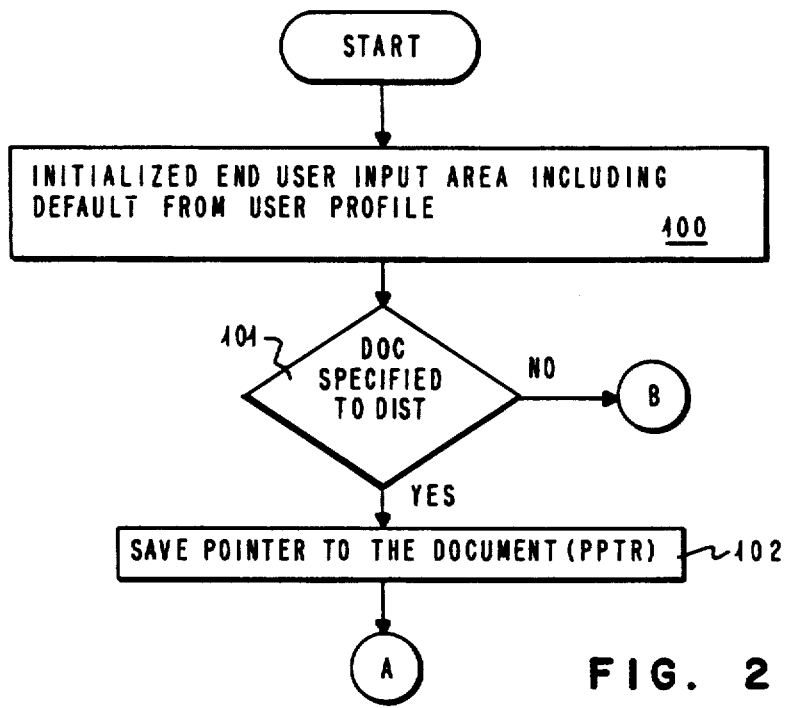
FIGS. 2 through 8 are flowcharts illustrating detailed steps of the method of the present invention.
Figure 3:
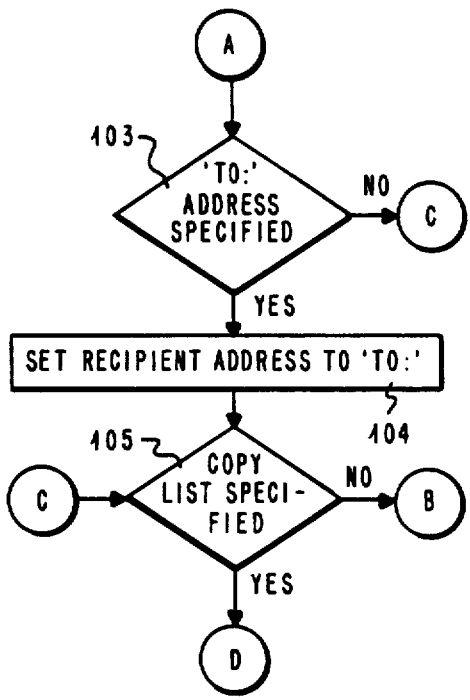
Figure 4:
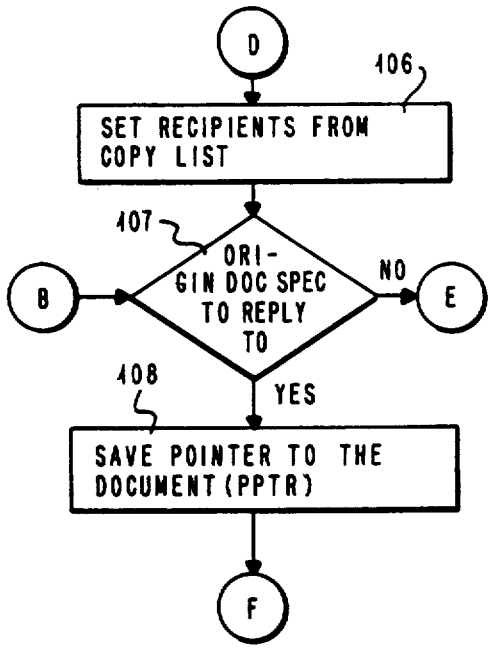
Figure 5:
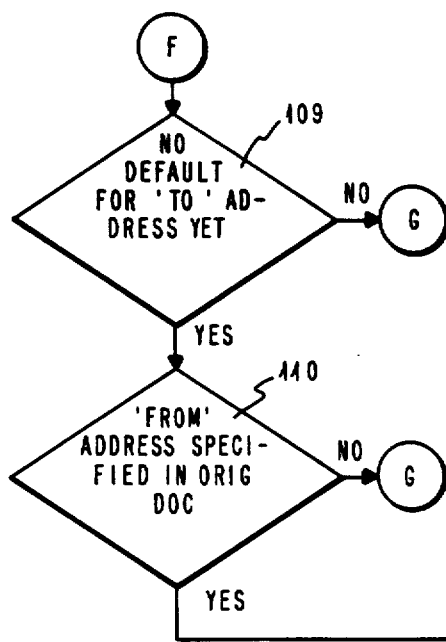
Figure 6:
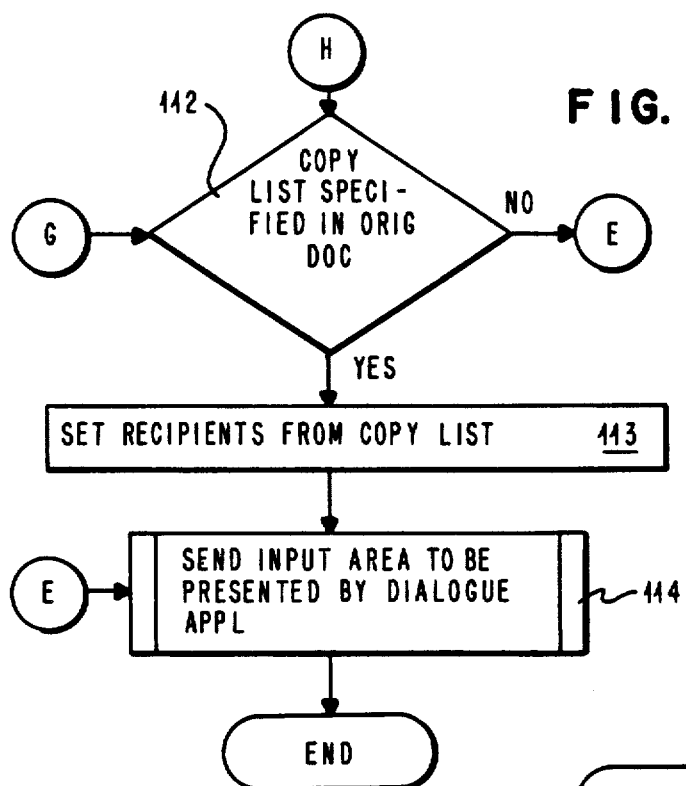

Referring to FIG. 1, there is shown a communication management system 10 which is a part of an electronic mail system. The communication management system 10 enables a first end user to create a note, message or document and transmit it to a designated end user or to a plurality of end users. Moreover, the system 10 allows the first end user to request that the original note, message or document be attached to any reply generated in response thereto. The attachment of the original note, message or document gives the user of system 10 flexibility in managing one's correspondence.

The first end user interacts with a dialogue manager application 12 which is a screen manager. The dialogue manager application 12 presents the first end user with a plurality of screens which enables the end user to enter the information required to create the form of communication desired and any attributes to facilitate the distribution of the form of communication to the designated recipient end users. The information entered by the first end user includes addressing information for all of the recipients and any distribution attributes. The distribution attributes include a return-reply requested attribute and an append or do not append the reply to the original document or form of communication attribute. The information entered further includes any requester/principal identifiers and a pointer to the note, message or document which is to be distributed.

The recipient end user may reply to a received note. System 10 allows the recipient end user to request a continuation of the dialogue by requesting that any reply to the recipient end user's reply be attached thereto. Thus, both end users may manage their respective correspondence. Similarly to that noted above, the recipient end user interacts with an associated dialogue manager 14 providing the information which is necessary to distribute the reply. This information includes addressing information which in most systems is defaulted from the sender of the original distribution; any distribution attributes which may be defaulted by a recipient's user profile and the original distribution; an indication whether to append a response to the reply document; a pointer to the reply document and a pointer to the original document to be appended.

Referring again to FIG. 1, the dialogue manager application 12 receives a request from the first end user (EU1) to send a document to the second end user (EU2). The request includes an indication that the EU1 desires a reply and that EU1 wants the original document appended to the reply. The dialogue manager application 12 then transmits the request to a requester application 16. The requester application 16 then transmits the request and the document to a mail application 18. The mail application 18 delivers the request and the document to a recipient application 20 which then passes the document and the request to the dialogue manager application 14. Thereafter, the dialogue manager application 14 presents the document and any additional information to EU2.

EU2 receives the document and the request for a reply and for appending the original to any reply to be generated. If EU2 decides to respond to the document sent by EU1, EU2 interacts with dialogue manager application 14 to generate the reply to the document sent by EU1. The dialogue manager application 14 transmits the request to a requester application 22. The request is then routed to the mail application 18 for delivery to a recipient application 24. The recipient application 24 passes the reply and any related information to the dialogue manager 12 for presentation to EU1.

Set out below is an illustration of an application program which is usable by the dialogue manager application 12 for distributing a document to EU2. The program is in program design language from which source code and machine code are derivable.

```
BEGIN DISTRIBUTION PREPARATION PROC
  INPUT
    USER PROFILE.
    POINTER TO DOCUMENT TO BE DISTRIBUTED.
    INDICATOR THAT THE DOCUMENT TO BE
    DISTRIBUTED IS A REPLY.
    POINTER TO DOCUMENT FOR WHICH A REPLY
    WILL BE DISTRIBUTED.
  PROCESS
    INITIALIZE AN APPLICATION INPUT AREA TO BE
    PRESENTED TO EU1.
    SET THE DISTRIBUTION CHARACTERISTICS
    INCLUDING APPEND/NO APPEND AS DEFAULTS
    FROM THE USER PROFILE.
    IF A DOCUMENT HAS BEEN SPECIFIED TO BE
    DISTRIBUTED, THEN
      SET THE DOCUMENT POINTER (PPTR) TO THE
      PHYSICAL LOCATION OF THE DOCUMENT.
      IF A "TO:" ADDRESS HAS BEEN SPECIFIED
      FOR THIS DOCUMENT, THEN
        SET THE RECIPIENT ADDRESS DEFAULT
        TO THE "TO:" ADDRESS OF THE
        DOCUMENT.
      ENDIF
      IF A COPY LIST HAS BEEN SPECIFIED FOR
      THIS DOCUMENT, THEN
        SET ADDITIONAL RECIPIENT ADDRESSES
        DEFAULT TO THE ADDRESSES IN THE
        COPY LIST OF THE DOCUMENT.
      ENDIF
    ENDIF
    IF A DOCUMENT HAS BEEN SPECIFIED AS AN
    ORIGINAL FOR A REPLY, THEN
      SET THE DOCUMENT POINTER (PPTR) TO THE
      PHYSICAL LOCATION OF THIS DOCUMENT.
      IF A SENDER ADDRESS HAS BEEN SPECIFIED
      FOR THIS DOCUMENT AND THE RECIPIENT
      ADDRESS HAS NOT BEEN DEFAULTED, THEN
        SET THE RECIPIENT ADDRESS DEFAULT
        TO THE SENDER ADDRESS OF THE
        DOCUMENT.
      ENDIF
      IF A COPY LIST HAS BEEN SPECIFIED FOR
      THIS DOCUMENT AND THE COPY LIST
      RECIPIENTS HAVE NOT BEEN DEFAULTED,
      THEN
        SET ADDITIONAL RECIPIENT ADDRESSES
        DEFAULT TO THE ADDRESSES IN THE
        COPY LIST OF THE DOCUMENT.
      ENDIF
    ENDIF
    SEND DEFAULTED INPUT AREA TO EU FOR
    COMPLETION AND VERIFICATION.
END DISTRIBUTION PREPARATION PROC
```

Referring to FIGS. 2 through 6, there is shown a flowchart for the distribution preparation application in gathering the necessary information from the EU1. Step 100 initializes the end user input area including any defaults from the EU1's user profile. The EU1 user profile can be used to setup some of the defaults in the input area. Any or all of the defaults can be overwritten by the EU1 when the input area is presented thereto. Step 101 determines whether EU1 has specified a particular document to be distributed. If a document was specified, step 102 saves a pointer to the document. Step 103 determines whether the particular document contains an addressee in an associated data area of the document or within a referenced place within the document itself. If the addressee is specified in the document, step 104 sets the specified recipient address. Step 105 determines if a copy list has been specified in an associated data area of the document or within a referenced place within the document itself. Step 106 sets the recipient address from the copy list. Step 107 determines whether EU1 specified that a reply for a particular document be distributed at the time the application was first called. For example, after viewing a list of documents, EU1 may have selected a document to which EU1 wanted a reply. Step 108 saves a pointer to the specified document. Step 109 determines if there is a default addressee for the document to be distributed. Step 110 determines whether there is a default address specified in an original document. This occurs when a reply to a document is being generated. Step 111 sets the recipient's address to the sender's address of the original document. Step 112 determines if a copy list was specified in the original document. Step 113 sets the recipient's address from the copy list contained in the original document. Step 114 then presents the entered data to EU1 for review.

Set out below is an illustration of an application program which is usable by the dialogue manager application 12 for creating and then distributing a document to EU2. The program is in program design language from which source code and machine code are derivable.

```
BEGIN GENERATE DISTRIBUTION PROC
  INPUT
    DISTRIBUTE INPUT AREA INCLUDING:
      INDICATOR FOR DOCUMENT TO BE
      DISTRIBUTED.
      INDICATOR THAT THE DOCUMENT TO BE
      DISTRIBUTED IS A REPLY.
      INDICATOR FOR DOCUMENT FOR WHICH A
      REPLY DOCUMENT HAS BEEN OR WILL BE
      GENERATED.
      ADDRESSING INFORMATION.
      REQUESTER/PRINCIPAL IDENTIFIERS.
      DISTRIBUTION CHARACTERISTICS INCLUDING
      APPEND/NO APPEND.
  PROCESS
    IF THE DOCUMENT TO BE DISTRIBUTED HAS NOT
    BEEN INDICATED, THEN
      IF A REPLYING DOCUMENT HAS BEEN
      SPECIFIED, THEN
        SET THE DEFAULTS FOR SUBJECT, TO,
        FROM, COPY LIST, AND REFERENCE FOR
        THE CREATE REPLY PROCESS.
      ENDIF
      CALL THE CREATE REPLY PROCESS.
      SET THE DOCUMENT POINTER (PPTR) FOR THE
      NEWLY CREATED DOCUMENT.
    ENDIF
    SET THE RECIPIENT ADDRESS AS SPECIFIED.
    SET THE DISTRIBUTION CHARACTERISTICS AS
    SPECIFIED.
    SET THE REQUESTER/PRINCIPAL IDENTIFIERS AS
    SPECIFIED.
    IF THE ORIGINAL DOCUMENT IS TO BE APPENDED
    TO THE REPLY, THEN
      SET THE DOCUMENT POINTER FOR THE
      ORIGINAL DOCUMENT.
      SET A REFERENCE INDICATING THAT THE
      ORIGINAL IS APPENDED TO THE REPLY
      DOCUMENT.
    ENDIF
    SEND COMPLETED DISTRIBUTION COMMAND.
END GENERATE DISTRIBUTION PROC
```

If EU1 is going to generate a document as a part of the distribution request, then a document will not be indicated. However, if EU1 wants to distribute an existing document, then EU1 must indicate the document as input to the generated distribution process. Either the document or a data area associated with the document for which a reply is to be generated may contain values for the subject, to, from, copy list and reference. These values can be set in the reply which is to be created by EU1. The pointer to the new document's physical location must be saved. If the original document for which the reply has been created is to be appended and sent with the reply document, then the address for the original must also be saved. If the original document for which the reply has been created is to be appended and sent with the reply document, then the append relation must be indicated in the distribution. The complete distribution request is then transmitted to the requester application 16 for transmittal to EU2.

Figure 7:
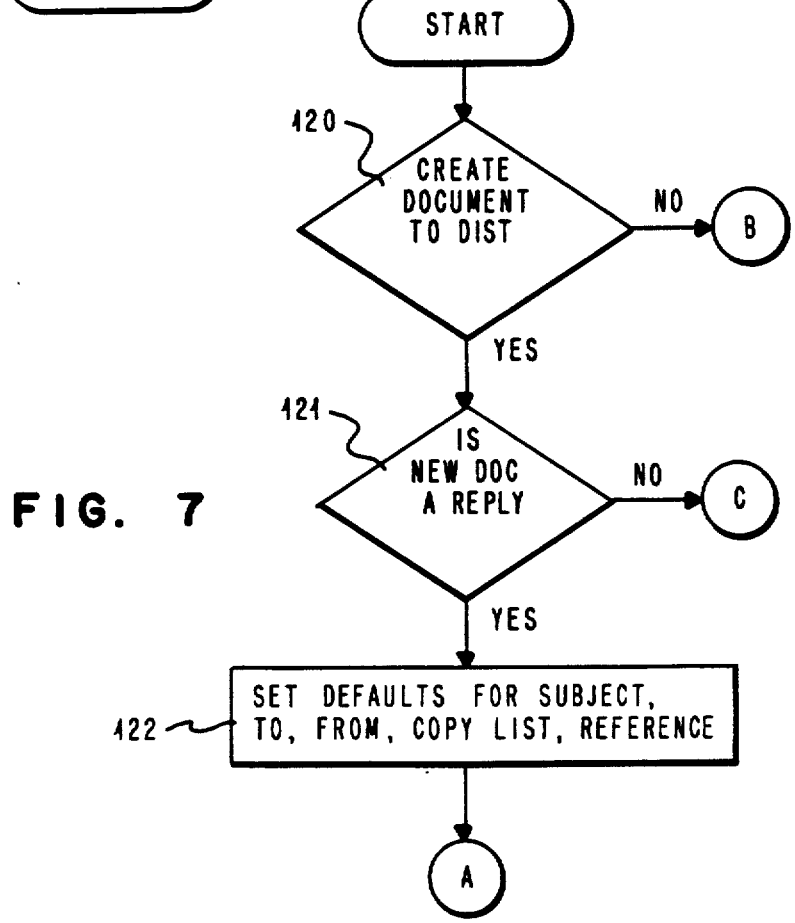
Figure 8:
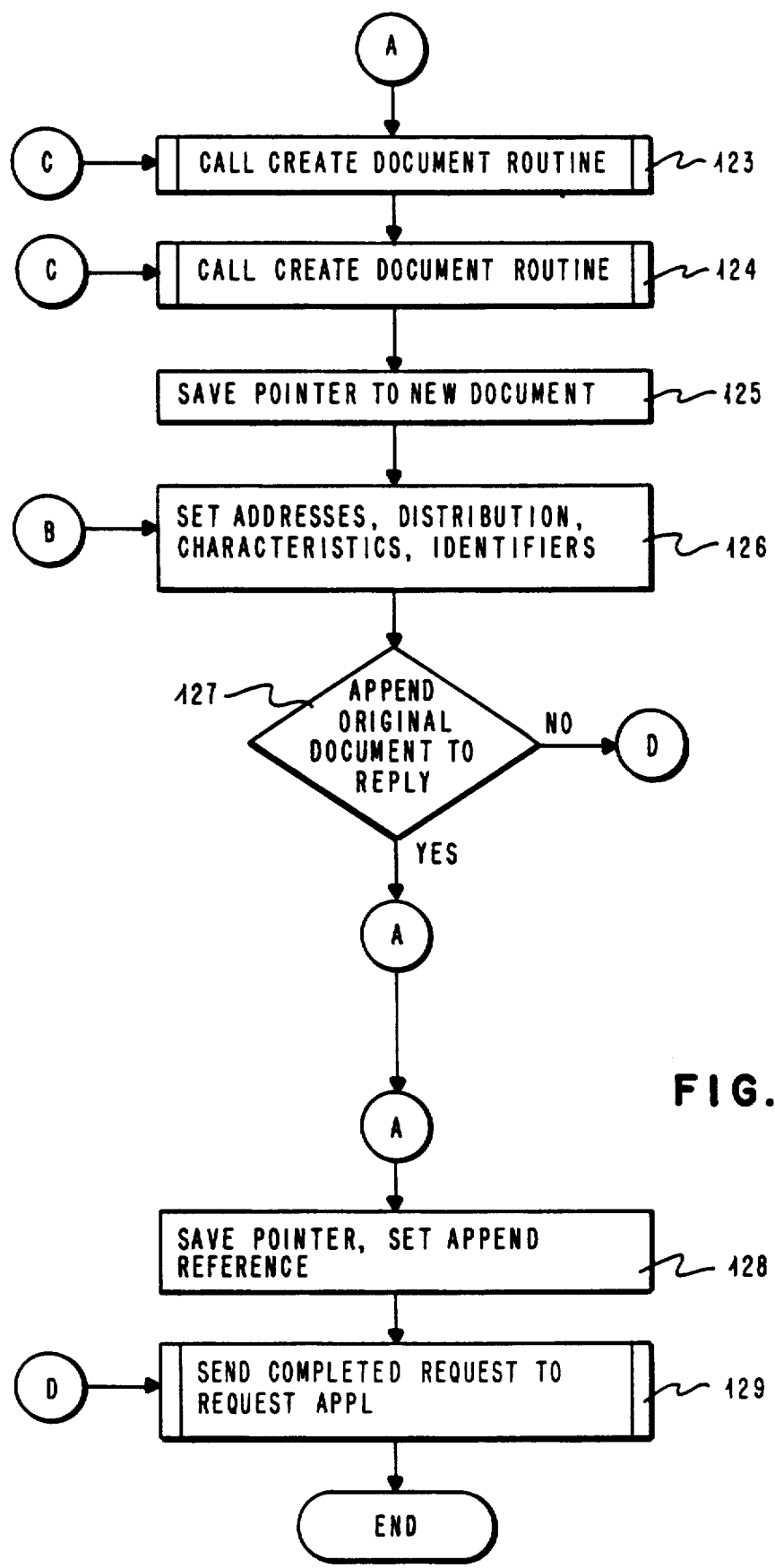

Referring to FIGS. 7 and 8, there is shown a flowchart for the generated distribution process in distributing an original document or the reply to the original document. Step 120 determines whether EU1 wants to create a document to be distributed. Step 121 determines if the document to be created is a reply document. If the document is a reply document, step 122 sets the defaults for the subject, the addressees, copy list and any references. Step 123 calls a create document routine to create the reply document or an original document. The create document routine of an electronic mail system is well known in the art and will not be discussed herein. Step 125 saves the pointer for the newly created document and step 126 sets the address, distribution characteristics and any identifiers set forth by EU1. Step 127 determines whether the original document should be appended to the reply. The pointer and the append reference are set in step 128. Step 129 transmits the completed request to the requester application 16 for distribution to EU2.

As noted above, the mail and recipient applications are well known applications in electronic mail systems and are not an integral part of the present invention and will not be discussed herein.

While the invention has been particularly shown and described with reference to a preferred embodiment, it will be understood by those skilled in the art that various changes in form and detail may be made without departing from the spirit and scope of the invention.

We claim:

1. In an information processing system having a plurality of end users exchanging documents therebetween, a method of selectively appending and maintaining a reference to an original document exchanged within the system, said method comprising the steps of:
   determining whether said original document includes an append attribute;
   selectively appending said original document to a reply document to be transmitted in response to said original document according to said append attribute associated with said original document; and
   transmitting, in response to said step of selectively appending, said reply document and said original document appended thereto within said system to an end user selected to receive both said reply document and said original document.

2. The method as recited in claim 1 further comprises the step of generating said reply document by a first end user in response to receiving said original document transmitted thereto by a second end user.

3. The method as recited in claim 4 further comprises the step of establishing an address for a recipient end user wherein said address information is not a default address attributed to said second end user.

4. The method as recited in claim 2 further includes the step of specifying address information and distribution attributes for said reply document.

* * * * *